(12) United States Patent
Michel et al.

(10) Patent No.: US 9,834,173 B2
(45) Date of Patent: Dec. 5, 2017

(54) BELT RETRACTOR WITH A RECOIL BRAKE

(71) Applicant: TRW Automotive GmbH, Alfdorf (DE)

(72) Inventors: Frederic Michel, Schwaebisch Gmuend (DE); Thomas Kielwein, Eschach (DE)

(73) Assignee: TRW Automotive GmbH (DE)

( * ) Notice: Subject to any disclaimer, the term of this patent is extended or adjusted under 35 U.S.C. 154(b) by 309 days.

(21) Appl. No.: 14/371,452

(22) PCT Filed: Jan. 10, 2013

(86) PCT No.: PCT/EP2013/000046
§ 371 (c)(1),
(2) Date: Jul. 10, 2014

(87) PCT Pub. No.: WO2013/107618
PCT Pub. Date: Jul. 25, 2013

(65) Prior Publication Data
US 2015/0001331 A1    Jan. 1, 2015

(30) Foreign Application Priority Data

Jan. 18, 2012 (DE) ........................ 10 2012 000 760

(51) Int. Cl.
*B60R 22/34* (2006.01)
(52) U.S. Cl.
CPC .......... *B60R 22/3413* (2013.01); *B60R 22/34* (2013.01); *B60R 2022/3419* (2013.01)

(58) Field of Classification Search
CPC ........ B60R 22/3413; B60R 2022/3419; B60R 22/34; B60R 22/3416
See application file for complete search history.

(56) References Cited

U.S. PATENT DOCUMENTS

| | | | | |
|---|---|---|---|---|
| 5,443,222 A * | 8/1995 | Modinger | ........... | B60R 22/4619 242/374 |
| 5,611,498 A * | 3/1997 | Miller, III | ........... | B60R 22/3413 242/379.1 |
| 6,439,494 B1 * | 8/2002 | Specht | ................ | B60R 22/3413 242/379.1 |
| 6,648,260 B2 * | 11/2003 | Webber | ............... | B60R 22/3413 242/379.1 |
| 8,052,219 B2 * | 11/2011 | Murakami | .............. | B60R 22/34 297/475 |

(Continued)

FOREIGN PATENT DOCUMENTS

| | | |
|---|---|---|
| DE | 103 44 785 | 9/2005 |
| EP | 2 189 339 | 5/2010 |
| JP | 11 334530 | 12/1999 |

*Primary Examiner* — Sang Kim
(74) *Attorney, Agent, or Firm* — Tarolli, Sundheim, Covell & Tummino LLP

(57) ABSTRACT

A coupling element (32) which is movable between a coupling position in which the coupling element couples the belt reel (12) to the damping means (22) and an idle position in which the coupling element (32) is disconnected from the belt reel (12) is provided on a belt retractor (10) comprising a belt reel (12) which is mounted in a housing (14) and onto which webbing of a seat belt can be wound and comprising a damping means (22) adapted to dampen the winding rotation of the belt reel (12) in a defined end portion.

14 Claims, 3 Drawing Sheets

(56) References Cited

U.S. PATENT DOCUMENTS

| | | | | |
|---|---|---|---|---|
| 2005/0284978 A1* | 12/2005 | Zolkower | ........... | B60R 22/3413 |
| | | | | 242/382.4 |
| 2008/0116310 A1* | 5/2008 | Bedak | ................. | B60R 22/3413 |
| | | | | 242/379 |
| 2008/0203807 A1* | 8/2008 | Yoshioka | ............ | B60R 22/3413 |
| | | | | 297/478 |
| 2014/0224916 A1* | 8/2014 | Asako | ..................... | B60R 22/36 |
| | | | | 242/390 |

* cited by examiner

BELT RETRACTOR WITH A RECOIL BRAKE

RELATED APPLICATIONS

This application corresponds to PCT/EP2013/000046, filed Jan. 10, 2013, which claims the benefit of German Application No. 10 2012 000 760.4, filed Jan. 18, 2012, the subject matter, of which are incorporated herein by reference in their entirety.

BACKGROUND OF THE INVENTION

The invention relates to a belt retractor comprising a belt reel supported in a housing onto which belt reel webbing of a seat belt can be wound and comprising a damping means adapted to dampen the winding rotation of the belt reel in a defined end portion.

Several belt retractors for seat belts include a damping means for decelerating the retracting movement of the belt reel shortly before the seat belt is completely retracted onto the belt reel. When the retracting movement is not decelerated, due to the high retracting speed and the inertia the webbing-sensitive blocking mechanism of the belt retractor can react after complete retraction of the seat belt and block the belt reel so that extension of the seat belt is not possible. The blocking mechanism can only be released by rotating the belt reel in the retracting direction. Since, however, the seat belt is completely wound up, this is possible only by pulling the seat belt so strongly that a short piece of the seat belt can be taken off by the reel of film effect. When the seat belt is subsequently released, the belt reel can slightly return and the blocking mechanism can be released.

In order to prevent such undesired blocking, from DE 103 44 785 A1, for example, a belt retractor comprising a damping means adapted to be coupled to the belt reel via a planetary gearing is known. The planetary gearing includes a control disk having a toothed profile in a defined area of the outer periphery. With a defined number of revolutions of the belt reel the control disk is pivoted so that it is engaged in a gearwheel coupled to the damping means, whereby a force-fit connection is made between the belt reel and the damping means.

It is a drawback of this belt retractor, however, that the coupling takes place in a defined area only which is predefined by the control disk and the planetary gearing, respectively. Adaptation to a different length of the webbing is only possible by appropriately adapting the control disk and the planetary gearing, respectively.

SUMMARY OF THE INVENTION

It is the object of the invention to provide a belt retractor for a seat belt having a simple design and at the same time permitting flexible adaptation of the damping timing.

In accordance with the invention, for achieving this object with a belt retractor of the type mentioned in the beginning a coupling element is provided which is movable between a coupling position in which the coupling element couples the belt reel to the damping means and an idle position in which the coupling element is disconnected from the belt reel. The coupling can be designed to be more flexible in this way, as the damping element is not activated after a fixed number of revolutions but at a point in time to be determined which can be freely fixed by adjusting the coupling element. The coupling element can be shifted at different points in time, for instance, which can be set based on the vehicle or based on the seat belt.

Preferably the coupling element is a gearwheel adapted to engage in a belt reel side gearwheel and a damping means side gearwheel. Such gearwheel permits easy transmission of the rotational movement of the belt reel to the damping means. The coupling via plural gearwheels moreover has the advantage that a simple reduction of the revolution of the belt reel is possible. By selecting an appropriate reduction gear ratio between the coupling element and the belt reel side gearwheel a desired deceleration and/or damping of the belt reel can be set with constant damping force of the damping means, for example.

The coupling element can be constantly in mesh with the belt reel side gearwheel and can be movably supported on an orbit about the axis of the belt reel. The bearing is a groove, for example, in which the axis of such coupling element is movably supported on an orbit. By the constant coupling to the belt reel side gearwheel during rotation of the belt reel side gearwheel the coupling element can be returned from the coupling position to the idle position and, respectively, back to the coupling position so that no external control or drive is required for this purpose.

In order to prevent the coupling element in this embodiment from being caught with every movement of the belt reel side gearwheel a lock element is provided that is adapted to fix the coupling element in the idle position. The coupling element is fixed by said lock element in the idle position during normal operation of the belt retractor. By release of the lock element at a defined point in time the coupling element can be released so that the latter can be shifted from the idle position to the coupling position. Although the lock element is driven by the coupling to the belt reel side gearwheel, it can rotate about its own axis in a resistance-free manner in the idle position, however.

The lock element is a rocker supported on the housing side, for example, which can be pivoted between the locking position and a release position. Such rocker can be easily pivoted between two positions so that easy release or locking of the coupling element is possible.

Preferably a spring element is provided which maintains the rocker in a bi-stable manner in the release position or the locking position. This ensures that the locking element cannot be moved to an intermediate position in which the locking element partly hinders or merely partly locks the coupling element. The coupling element is definitely either released or locked.

For this locking element preferably a control is provided by which the time of releasing or locking the coupling element is predetermined or can be set.

The control may include, for example, a planetary gear train, wherein the planetary gearing comprises a belt reel side sun gear, a housing side annulus gear as well as at least one planet gear being engaged in the sun gear and the annulus gear. The planet gear preferably moves the rocker between the locking position and the release position. Upon rotation of the belt reel the planet gear moves on the orbit about the axis of the belt reel, wherein the ratio of the rotational speed of the belt reel to the revolving speed of the planet gear is defined by the transmission ratio between the planet gear, the sun gear and the annulus gear. At the same time, the planet gear rotates about its own axis. The rocker is designed so that it protrudes into the orbit of the planet gear and can be actuated by the latter upon rotation of the belt retractor.

For actuating the rocker preferably on the planet gear catches are provided which act on projections of the rocker and are capable of actuating the same. The catches can be, for example, axially projecting webs acting on the projections of the rocker and actuating the same, respectively. The transmission ratio between the planet gear, the sun gear and the annulus gear can be selected such that the catches are oriented upon a revolution of the planet gear so that they actuate the rocker, while in a preceding or successive revolution the catches are oriented so that they are passed by the projections of the rocker. In this way also plural revolutions of the planet gear are possible, thereby the belt retractor having a larger retracting and extending range, respectively, without coupling the belt reel to the damping means again after a longer extension. This effect can be achieved, for instance, by the fact that the transmission ratio is selected so that in a first revolution the catch of the outside radial relative to the annulus gear is guided against the rocker and in a further revolution is passed by the rocker on the radial inside so that the catches do not act on the rocker.

The damping means is preferably speed-sensitive so that with high rotational speeds of the belt reel higher damping is performed.

BRIEF DESCRIPTION OF THE DRAWINGS

Further advantages and features are resulting from the following description in combination with the enclosed drawings, in which.

DESCRIPTION OF EXEMPLARY EMBODIMENT

Figure 1:
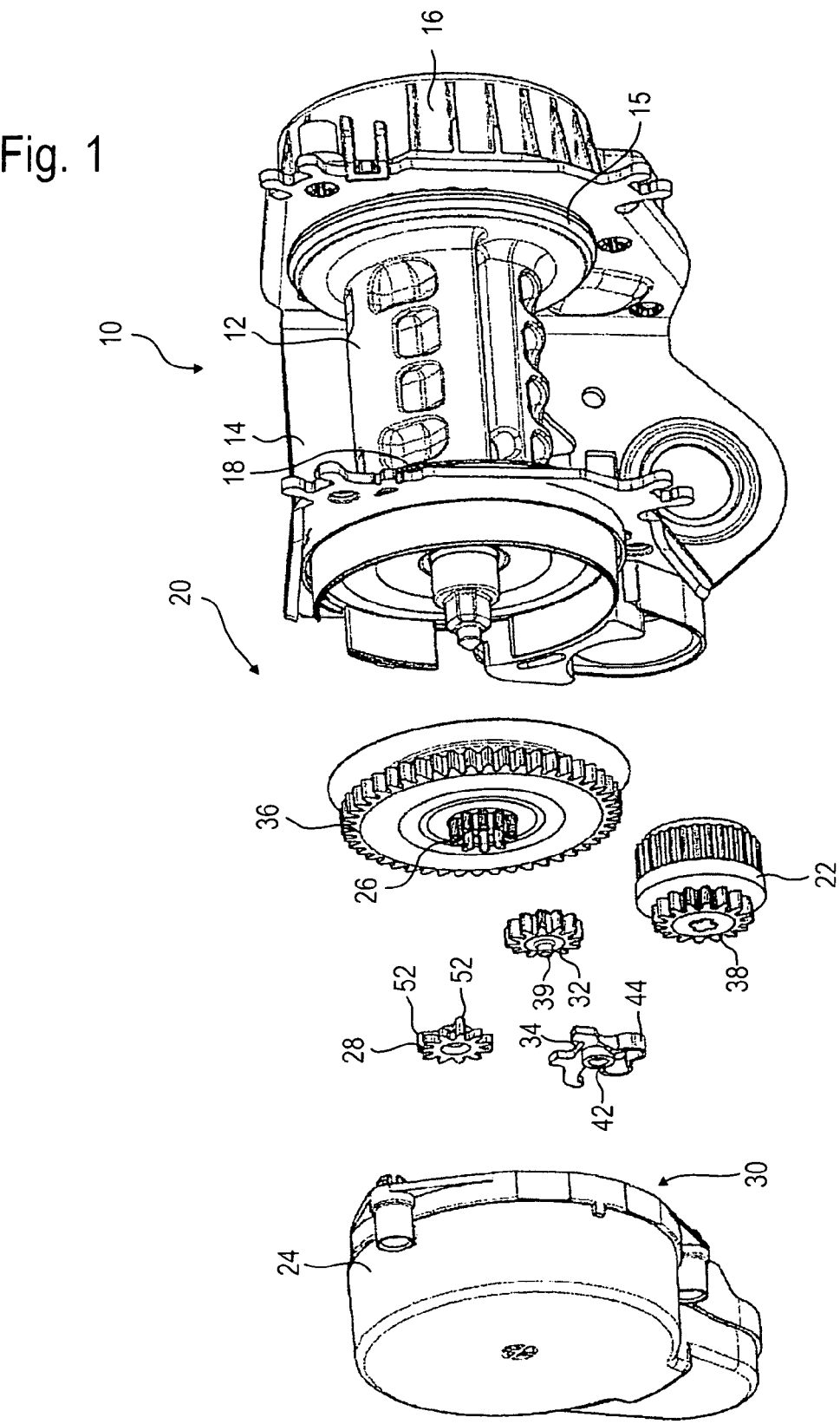
FIG. 1 shows an exploded view of a belt retractor according to the invention.

FIG. 1 illustrates a belt retractor 10 comprising a belt reel 12 onto which webbing of a seat belt can be wound. The belt reel 12 is rotatably supported in a housing 14 and on a first flange 15 includes a drive 16 not shown in detail here for retracting the webbing. The drive may have a normal retracting drive and/or a belt tensioner. On the second flange 18 of the belt reel 12 a coupling means 20 is provided for coupling the belt reel 12 to a damping means 22 which is adapted to decelerate a retracting movement of the belt reel 12. The damping means 22 and the coupling means 20 are arranged in a housing cover 24.

The coupling means 20 includes a control unit which is substantially formed by a planetary gearing. The planetary gearing comprises a sun gear 26 permanently coupled to the belt reel 12, a planet gear 28 as well as an annulus gear 30 formed by a toothing 48 on the inside of the housing cover 24 (cf. also FIG. 2). Moreover, the control unit includes a lock element 34 in form of a rocker the function of which will be explained hereinafter.

Figure 3:
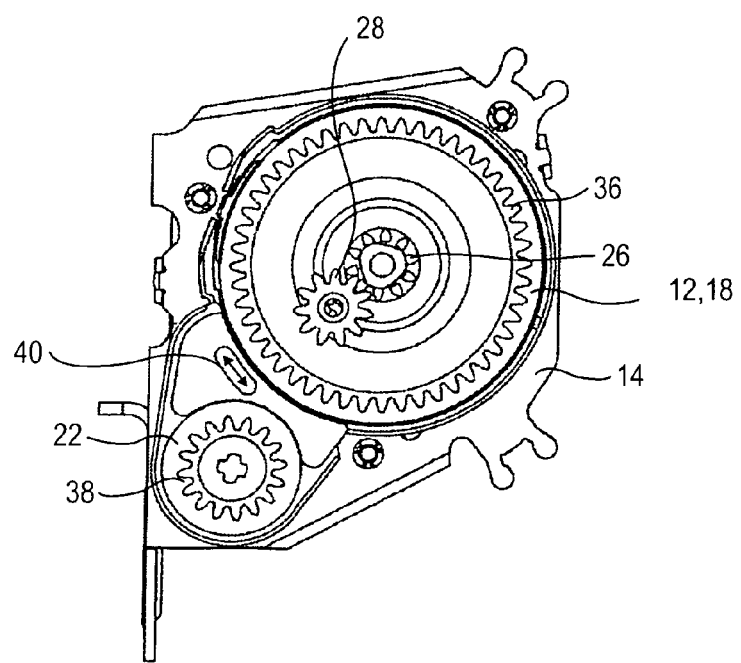
FIG. 3 shows a first sectional view across the belt retractor of FIG. 1 in the area of the planetary gearing.
Figure 4:
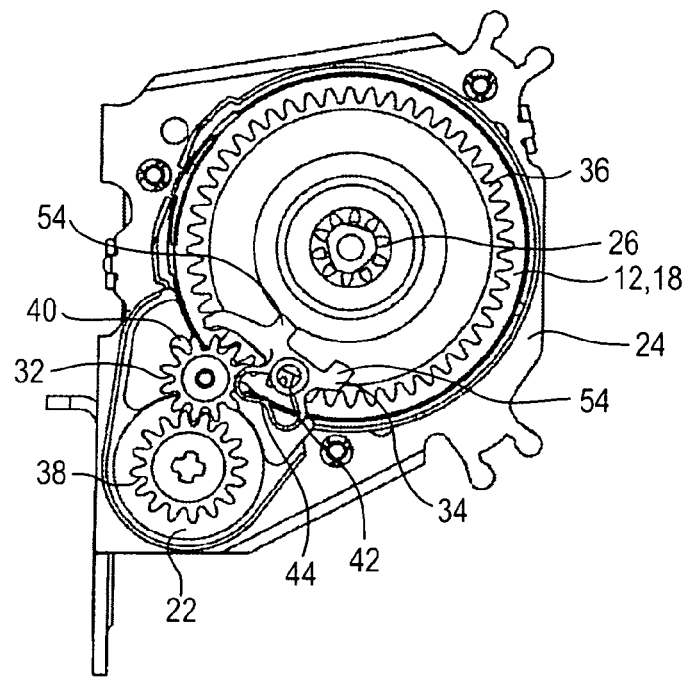
FIG. 4 shows a second sectional view across the belt retractor of FIG. 1 including the coupling element and the lock element.

Another belt reel side gearwheel 36 which may be coupled to a damping means side gearwheel 38 via a coupling element 32 in the form of a gearwheel is coupled to the sun gear 26 (cf. also FIGS. 3 and 4).

On the housing 14 a groove 40 is provided in which the coupling element 32 is supported with an axis 39 and is movable between a coupling position and an idle position (cf. FIGS. 3 and 4). The groove 40 extends along an orbit about the axis of the gearwheel 36 and of the belt reel 12, respectively, the distance of the groove 40 from the axis being selected so that the coupling element 32 is constantly engaged in the gearwheel 36 irrespective of the position in the groove 40 (cf. FIGS. 4 and 5).

In the coupling position shown in FIG. 4 the coupling element 32 is in engagement with the damping means side gearwheel 38 so that the belt reel 12 is coupled to the damping means 22 and a movement of the belt reel 12 is thus damped.

Figure 5:
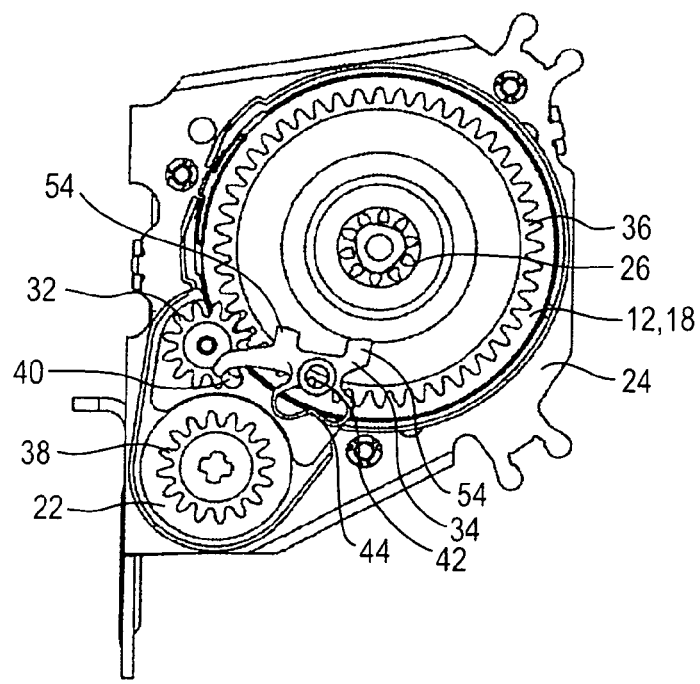
FIG. 5 shows the belt retractor of FIG. 4 including the coupling element in the idle position.

The coupling element 32 can be moved in the groove 40 from said coupling position into the idle position shown in FIG. 5 in which the connection between the belt reel 12 and the damping means 22 is interrupted. In said idle position the coupling element 32 can rotate about its own axis 39 free from resistance upon rotation of the belt reel side gearwheel 36 so that the rotation of the belt reel is not influenced.

The movement of the coupling element 32 between the coupling position and the idle position is carried out by rotation of the sun gear 26 in that the coupling element 32 is caught by the toothing of the gearwheel 36. Any additional control for moving the coupling element 32 is not required.

For fixing the coupling element 32 in the idle position and releasing it merely in a defined retracting range so that it can be shifted to the coupling position a lock element 34 is provided, which in this case is in the form of a rocker. Said lock element 34 fixes the coupling element 32 in the idle position (cf. FIG. 5) so that the latter cannot be engaged in the damping means 22. The rotation of the coupling element 32 about its own axis 39 is not hindered, however. At a fixed point in time the lock element 34 can release the coupling element so that the latter can be caught by the gearwheel 36 and can be shifted to the coupling position in the groove 40.

The lock element 34 is mounted about a pivot point 42 on the housing side and includes a heart-shaped spring element 44 adjacent to a housing side stop 46. The spring element 44 and the stop 46, resp., are configured so that the lock element 34 can be pivoted between a release position and a locking position in a bistable manner. In the locking position shown in FIG. 5 the lock element 34 is adjacent to the coupling element 32 and fixes the same in the idle position. In the release position the lock element 34 releases the coupling element 32 so that it can be moved to the coupling position.

The rocker and the lock element 34, resp., are controlled via the planetary gearing of the belt retractor 10. As is evident in FIGS. 2 and 3, the planet gear 28 is permanently coupled both to the sun gear 26 and to the toothing 48 of the annulus gear 30. In this way the planet gear 28 is moved about the sun gear 26 on an orbit 50 extending concentrically to the axis of the belt reel 12 and accordingly is rotated about its own axis. On the planet gear 28 axially projecting catches 52 are provided (as is visible in FIG. 2) which, upon rotation of the belt reel 12 and upon the resulting rotation of the planet gear 28 about itself, actuate the lock element 34 so that the latter is pivoted from the locking position to the release position and, respectively, upon rotation of the belt reel 12 in the opposite direction from the release position to the locking position.

The transmission ratio between the sun gear 26, the planet gear 28 and the annulus gear 30 is selected so that the planet gear 28 has a different orientation with each revolution so that the catches 52 are not adjacent to the projections 54 of the lock element 34 with each revolution. The planet gear 28 and the catches 52, resp., during one revolution actuate the lock element 34. During the next revolution, however, the catches 52 are offset so that they are passed by the projections 54 of the rocker without actuating them. This permits several revolutions of the planet gear 28, where the rocker is not actuated and the damping of the belt reel 12 is not activated with each revolution. Hence a substantially larger extension distance is possible even over plural revolutions of the planet gear 28.

Figure 2:
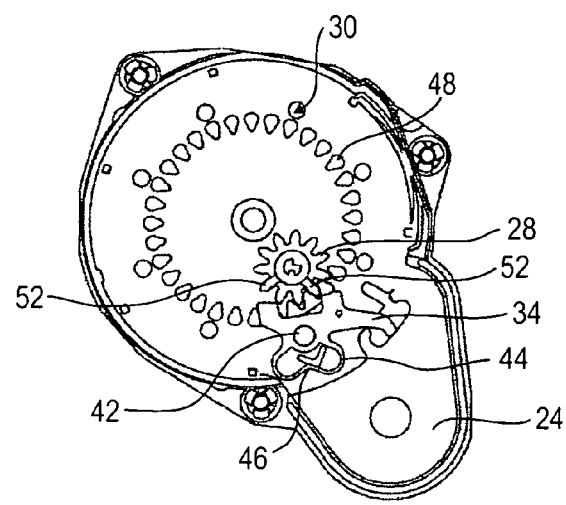
FIG. 2 shows a side view of the housing cover of the belt retractor of FIG. 1.

As is evident especially from FIG. 2, two catches 52 are provided on the planet gear 28, wherein one catch 52 is provided for pivoting the lock element 34 into the locking position and one catch 52 is provided for pivoting it to the release position, a respective projection 54 for each catch 52 being provided on the lock element 34. The number and the position of the catches 52 can be adapted at will. Especially the catches 52 need not project in the axial direction.

When the lock element 34 is moved into the locking position while the coupling element 32 is in the coupling position, the lock element 34 is automatically urged back to the release position by the coupling element 32 when the latter is shifted to the idle position. Thus any malfunction, for example by locking the coupling element 32 in the coupling position, is safely excluded.

Since the coupling means 20 and the lock element 34 in this embodiment are controlled exclusively by rotating the belt reel 12, no separate control is required to adjust the coupling element 32. However, also other controls are imaginable for the coupling element 32 and the locking element 34, respectively. It has merely to be ensured that the coupling element 32 can be fixed in the idle position and is released only at a defined point in time and, resp., shifted to the locking position.

The damping means 22 can be a damping means known per se. It is preferably speed-sensitive so that at high rotational speeds of the belt reel 12 a stronger damping effect is exerted on the same.

The invention claimed is:

1. A belt retractor (10) comprising a belt reel (12) supported in a housing (14) onto which webbing of a seat belt can be wound and comprising damping means (22) adapted to dampen the winding rotation of the belt reel (12) in a defined end portion,
wherein a coupling element (32) is provided which is movable between a coupling position in which the coupling element couples the belt reel (12) to the damping means (22) and an idle position in which the damping means (22) is disconnected from the belt reel (12),
and wherein the coupling element (32) is a gearwheel adapted to directly engage in a belt reel side gearwheel (36) and a damping means side gearwheel (38).

2. The belt retractor according to claim 1, wherein the coupling element (32) is in constant engagement with the belt reel side gearwheel (36) and is movably supported on an orbit about the axis of the belt reel (12).

3. The belt retractor according to claim 1, wherein a lock element (34) is provided which is adapted to fix the coupling element (32) in the idle position.

4. The belt retractor according to claim 3, wherein the lock element (34) is a rocker mounted on the housing side which can be pivoted between a locking position and a release position.

5. The belt retractor according to claim 4, wherein a spring element (44) is provided for maintaining the rocker in a bistable manner in the release position or in the locking position.

6. The belt retractor according to claim 4, wherein a control is provided for the lock element (34).

7. The belt retractor according to claim 6, wherein the control includes a planetary gear train, the planetary gear comprising a belt reel side sun gear (26), a housing side annulus gear (30) as well as at least one planet gear (28) which is in mesh with the sun gear (26) and the annulus gear (30), the planet gear (28) moving the rocker between the locking position and the release position.

8. The belt retractor according to claim 7, wherein catches (52) acting on projections (54) of the rocker are provided at the planet gear (28).

9. The belt retractor according to claim 1, wherein the damping means (22) is a speed-sensitive rotation damper.

10. A belt retractor, comprising:
a housing;
a belt reel rotatably supported in the housing onto which seat belt webbing can be wound;
a belt reel side gearwheel connected for rotation with the belt reel;
damping means for dampening rotation of the belt reel in a winding direction;
a damping means side gearwheel connected for rotation with the damping means; and
a coupling element gearwheel adapted to directly engage the belt reel side gearwheel and the damping means side gearwheel, the coupling element being movable between a coupling position in which the coupling element gearwheel couples the belt reel to the damping means and an idle position in which the belt reel is disconnected from the damping means.

11. The belt retractor according to claim 10, wherein the coupling element gearwheel is in constant engagement with the belt reel side gearwheel and is supported for orbital movement about a rotational axis of the belt reel.

12. The belt retractor according to claim 10, further comprising a rocker lock element that is adapted to fix the coupling element in the idle position, the rocker lock element being mounted on the housing for pivotable movement between a locking position and a release position.

13. The belt retractor according to claim 12, further comprising a control for the rocker lock element, the control including a planetary gear train having a belt reel side sun gear, a housing side annulus gear, and at least one planet gear in mesh with the sun gear and the annulus gear, the planet gear moving the rocker lock element between the locking position and the release position.

14. The belt retractor according to claim 13, wherein the rocker lock element includes projections and the planet gear is provided with catches that act on the projections.

* * * * *